June 21, 1966 P. R. GILTNER 3,256,861
TIME CONTROLLED AUTOMATIC FEED DISPENSING DEVICE FOR ANIMALS
Filed Oct. 16, 1963 4 Sheets-Sheet 3
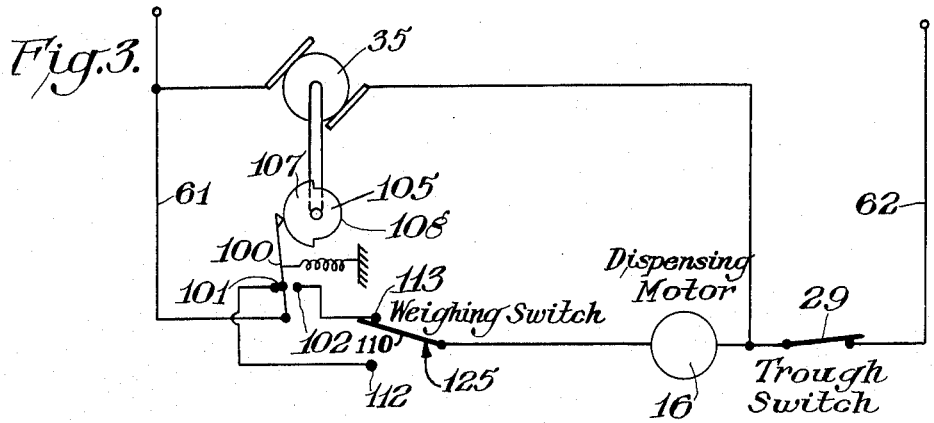
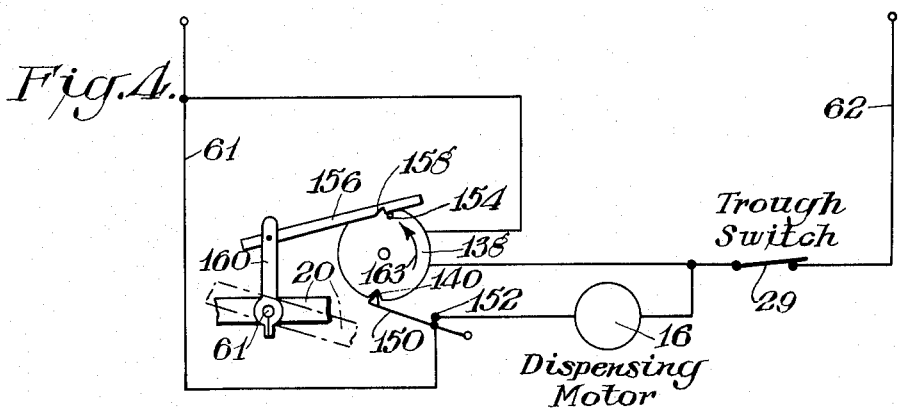
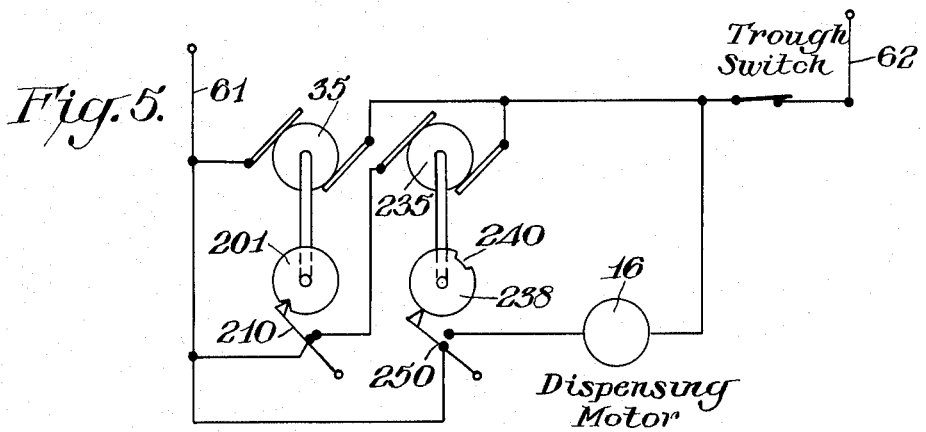
INVENTOR
Paul R. Giltner
BY Connolly and Hutz
ATTORNEYS June 21, 1966  P. R. GILTNER  3,256,861
TIME CONTROLLED AUTOMATIC FEED DISPENSING DEVICE FOR ANIMALS
Filed Oct. 16, 1963  4 Sheets-Sheet 4
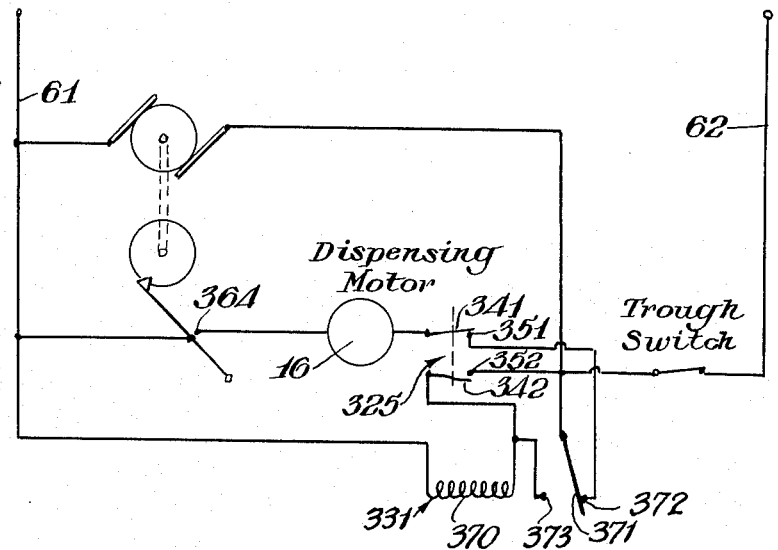
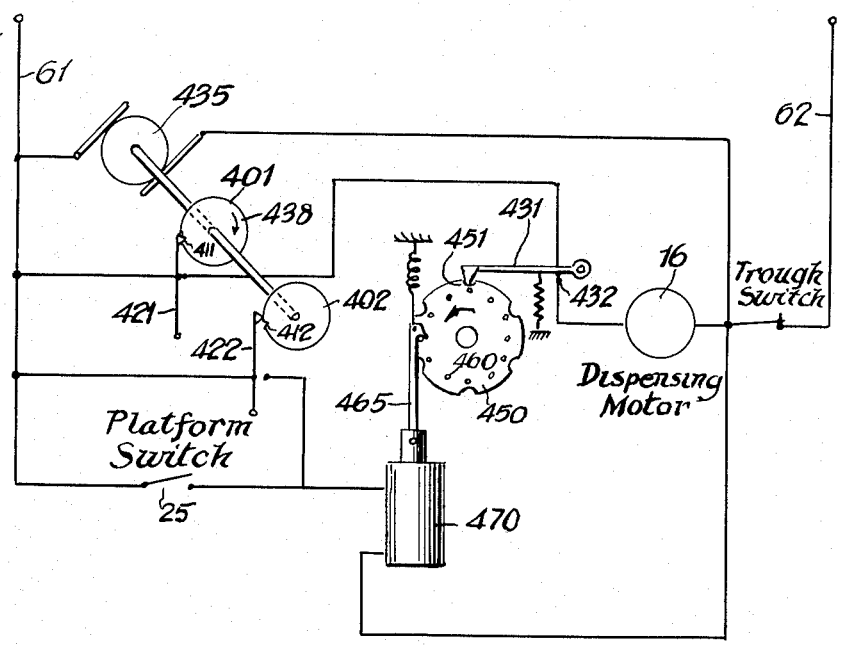
INVENTOR
Paul R. Giltner
BY Connolly and Hutz
ATTORNEYS 3,256,861
TIME CONTROLLED AUTOMATIC FEED DISPENSING DEVICE FOR ANIMALS
Paul R. Giltner, 2406 Stanton St., Lake Charles, La.
Filed Oct. 16, 1963, Ser. No. 316,660
17 Claims. (Cl. 119—51.11)

This application is in part a continuation of prior application Serial No. 85,599 filed January 30, 1961 (now abandoned).

The present invention relates to animal feeding apparatus and more particularly to the automatic dispensing of a predetermined quantity of feed or the like at spaced intervals over an extended period of time.

Among the objects of the present invention is the provision of automatic feeding apparatus of the above type which is simple to construct and use and also very dependable.

The above as well as additional objects of the present invention will be more readily recognized and understood from the following description of several of its exemplifications, reference being made to the accompanying drawings wherein:

FIGS. 3, 4, 5, 6 and 7 show somewhat different operating circuits typical of the present invention.

An automatic animal feeder according to the present invention can comprise an elevated bulk storage hopper carrying a timer-controlled dispensing mechanism, a weighing platform positioned to receive feed dispensed by the dispensing mechanism and to tilt to discharge the feed when it accumulates to a predetermined weight on the platform, a feeding trough positioned to catch the feed discharged from the platform and to trip a switch when it contains such feed, said switch being connected to disable the dispensing means and keep uneaten feed from accumulating in the trough.

The dispensing mechanism is desirably battery operated and the switch can be connected to stop all consumption of battery power when it is tripped. For dispensing mechanism to control flow of the fluent feed particles onto the weighing platform, the storage hopper can have a cylindrical outlet spout with a conical helical spring within the spout, the widest portion of the spring substantially blocking the spout and causing the body of the particles to wedge into non-flowing condition when the spring is held stationary, means being provided for rotating the spring to thereby cause the particles so wedged to loosen and flow past the spring and out of the spout.

For the purpose of providing a more positive as well as more accurate weighing of the feed during the dispensing operation, the weighing platform can have a magnetic-type holder connected to provide magnetic attraction between the platform and a stop that holds it in its feed-receiving position, at the same time providing substantially no attraction toward that stop when the platform is tilted to its discharge position.

Another aspect of the present invention is the use of a simple and dependable control arrangement. Because feeding cycles might be spaced as much as twelve hours or more apart, a simple timer for this purpose will trip a switch, for example, and keep the switch tripped for a substantial period of time before the continued operation of the timer will return the switch to its untripped condition. On the other hand, the feed dispensing operation itself cannot conveniently be stretched out very long so that it is particularly desirable to control the timer switch so that it starts a feed-dispensing cycle and to then block the switch so that it cannot start another dispensing cycle until after the dispensed feed is consumed.

Figure 1:
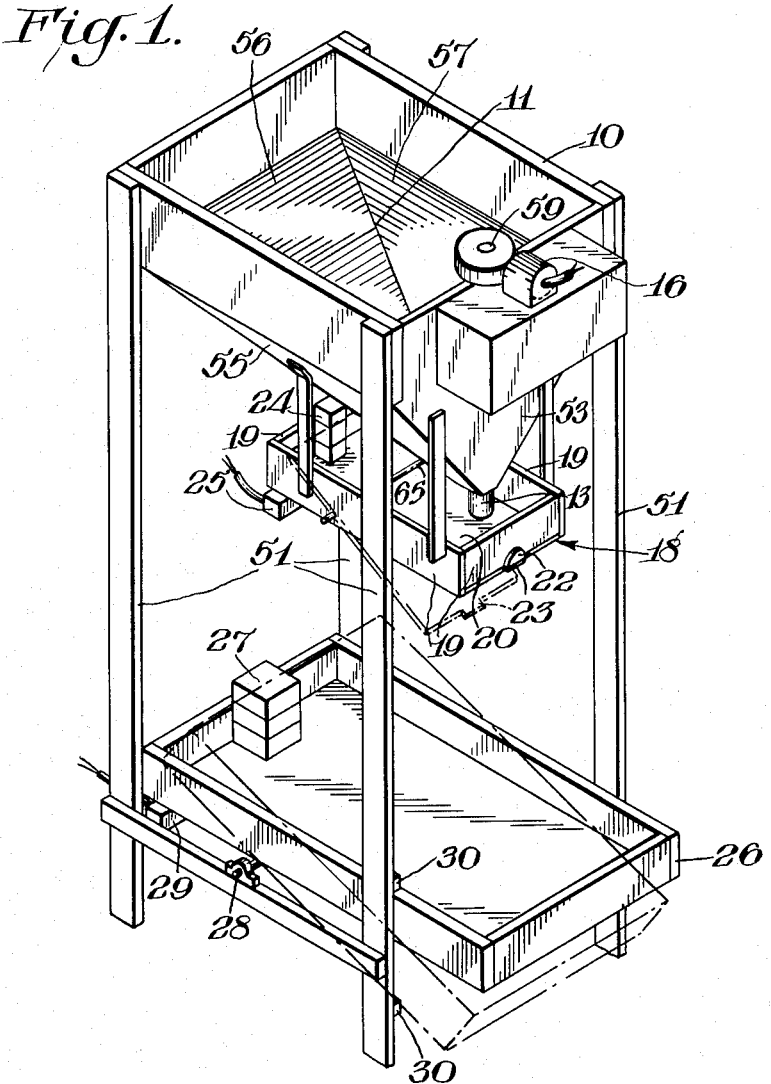
FIG. 1 is a perspective view of a feeding apparatus representative of the present invention.
Figure 2:
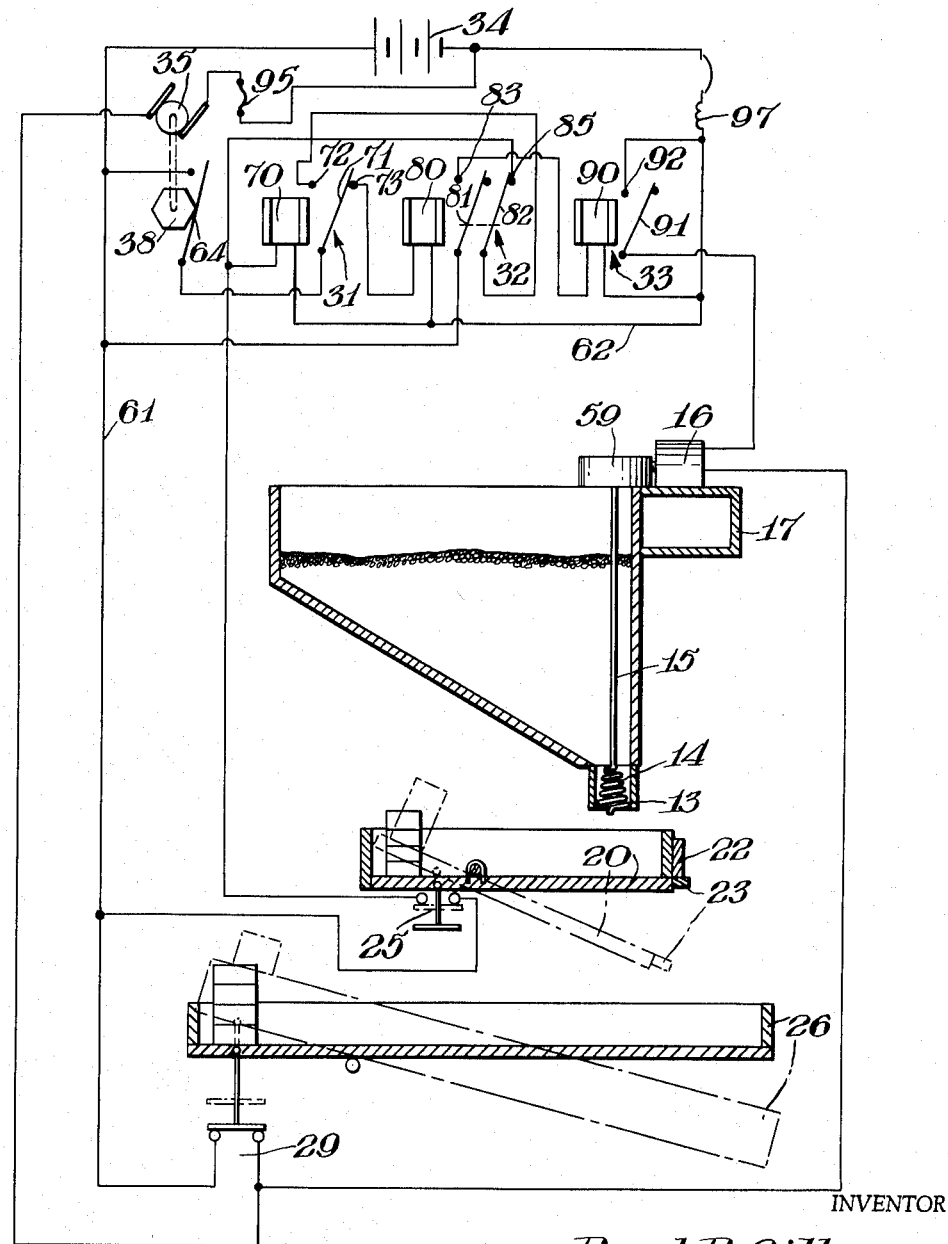
FIG. 2 is a sectional view of the structural portion of the apparatus of FIG. 1 along with the details of an operating circuit.

Referring now to the drawings, FIG. 1 shows a feeder having a storage bin 10 supported by legs 51 in an elevated position. The lower portion of the bin is shaped in the form of a hopper 11 having one wall 53 vertically disposed and three other walls 55, 56, 57 sloping downwardly towards the vertical wall. At the lowest portion of the hopper there is positioned a discharge tube 13 within which is located a dispensing device. A particularly preferred form of dispensing device is shown in FIG. 2 and includes a conically shaped helical spring 14 rotatably held on a vertical shaft 15 for operation by a rotary driving device. An electric motor 16 and speed reducer 59 make an effective driving arrangement.

The spring 14 is arranged so that at its widest portion it substantially fills the interior of the discharge tube 13. The clearance at this point can be the same as the spacing between adjacent turns of the spring. For feed such as oats or similar grains, a clearance of about ¼ inch is highly effective, although it can vary from ⅛ inch to ⅜ inch. Coarser fluent material can take a correspondingly larger spacing.

Below the discharge tube 13 there is positioned a weighing device 18 shown as a combination of four fixed box-like type sides 19 holding a tilting floor or platform 20. The sides 19 can be suspended from the hopper or other portions of the feeder and a pivot pin 65 penetrating through opposing side walls 19 pivotally holds the tilting platform in place.

The platform 20 can be counterbalanced as by means of removable and adjustable weights 24. In addition, the front edge of the platform 20 is magnetically held in a substantially level position against the lower edge of the sides 19 by a magnetic securing device which in the figure includes a magnet 22 fixed to the appropriate wall 19, and a magnetizable armature 23 secured to the front edge of the platform. A switch 25 also held by one of the walls 19 is so located as to be tripped by the tilting of the platform.

A substantial distance below the weighing device 18 is a feed trough 26 which can also be counterweighted as shown at 27 and pivoted as by rocker shaft 28 so that it tilts into the position shown by the dot-dash lines when the weighed quantity of feed is dropped onto it. Limit stops 30 can be provided on one or more of the legs 51 to limit the tilting travel of the trough. A switch 29 similar to switch 25 is provided for tripping by the tilting action of the feed trough.

Enough space is provided between the feed trough and the weighing device to not only allow for the head of an animal to be inserted, but in addition the weighing device can be elevated sufficiently high to keep it from being damaged by the animals to be fed. The feeder can, for example, be installed in a barn or similar structure for the feeding of cows and/or horses, in which event the weighing platform can be six to eight feet above the feed trough and a ladder can then be provided for access to and filling of the bin. The bin may also be covered.

One very effective circuit for automatically cycling the feeder is shown in FIG. 2. A battery 34 is connected with a timing motor 35 that operates timing cam 38 and coacts with a set of relays 31, 32 and 33. All these members can be assembled together and can be housed in a container 17 shown as secured to the storage bin near its top.

Oppositely poled bus leads 61, 62 run from the battery 34. A timer switch 64 operated by cam 38 connects bus 61 to an armature 71 of relay 31. This armature is biased to close a circuit against a front contact 73 that leads through winding 80 of relay 32 to bus 62. The winding 70 of relay 31 is connected at one end to bus 62, and at the other end through platform switch 25 to bus 61.

Relay 32 has two armatures 81, 82 that move together and are biased to the position shown. In this position armature 81, which is connected to bus 61, holds open a circuit to back contact 83 which leads through winding 90 of relay 33 to bus 62. Armature 82, which is connected to a back contact 72 for armature 71, is at the same time engaged against a front contact that also leads through platform switch 25 to bus 61.

Relay 33 has a single armature 91 biased away from a back contact which leads to bus 62. Armature 91 is connected through feed motor 16 and trough switch 29 to bus 61. Timer motor 35 is shown as having one of its terminals connected to bus 62 through a fuse 95, and its other terminal connected to bus 61 through trough switch 29. Another fuse or magnetic circuit breaker 97 can be used to separately protect the feed motor circuit, but if desired a single protective device of this kind can be connected to protect both motors.

In operation the feeder of FIG. 2 will, between feeding times, normally have its various elements in the position shown by full lines, and timing switch 64 will be open. The timer motor 35 will be running and upon rotation of the cam sufficiently far in its timing cycle, switch 64 will close. This completes a circuit from bus 61 through armature 71, front contact 73 and winding 80 to bus 62. Relay 32 will accordingly have its winding energized, pulling its armatures over to their back positions. Armature 88 in its back position completes a circuit from bus 61 through back contact 83 and winding 90 to bus 62. Armature 82 at the same time moves with armature 81 and opens a circuit between switch 25 and back contact 72 of relay 31.

The completion of the circuit through winding 90 energizes this winding to pull its armature over against contact 92, thereby closing the operating circuit for feed motor 16. Dispensing of the feed will then begin and the feed will accumulate on platform 20. When the desired weight of feed accumulates there it will cause the platform to break its magnetic connection and to tilt into the position shown in dot-dash lines. This tilting causes the accumulated feed to slide off the platform into the feed trough 26, and also closes switch 25. The closing of switch 25 completes a circuit from bus 61 through winding 70 to bus 62, thereby energizing relay 31 and pulling its armature 71 away from its front contact and against its back contact. When armature 71 separates from its front contact it opens the energizing circuit for winding 80 and this deenergizes relay 32, permitting armatures 81, 82 to move away from their back positions. Such movement of armature 81 opens the energizing circuit for winding 90 which thereby releases its armature 91, permitting it to move away from its back contact and open the energizing circuit for feed motor 16. Dispensing of the feed is accordingly stopped.

The feed discharging from platform 20 lands in trough 26 and causes the trough to tilt into the position shown in dot-dash lines. This opens switch 29, thus holding open the circuit for feed motor 16. In the meantime, after all the feed is discharged from platform 20, that platform tilts back to its level position indicated in full lines and thus opens switch 25 again. The opening of this switch does not denergize relay 31 because this relay became locked into energized position upon the release of armature 82 so that it engages its front contact 85. The complete lock-in circuit extends from bus 61 through timer switch 64, armature 71, back contact 72, armature 82, front contact 85 and winding 70 to bus 62. Relay 31 accordingly remains locked in, preventing armature 71 from engaging its front contact and keeping open the energizing circuit for relay 32. The locked-in condition persists so long as timer 38 keeps its switch 64 closed. Because of the slowness of the cam rotation this closed condition of switch 64 may persist for as much as a half hour or more after the dispensing cycle has been completed and the feed has all been consumed. Eventually, however, timer switch 64 opens, unlocking relay 31 and restoring the equipment to the original condition.

In the event the feed is not consumed, trough 26 will remain tilted into the dot-dash position and switch 29 will remain open. This keeps the timer from operating so that the entire assembly stays in such arrested condition with relay 31 remaining locked in until the feed is consumed or removed from the trough. During this arrested condition no additional dispensing will take place so that the feeder automatically avoids the dispensing of excess feed. Moreover, because the timer is also rendered inoperable during the arrested condition, the next dispensing cycle is not begun until the consumption of the feed is completed and the timer cam goes through a complete inter-feeding run.

FIG. 3 shows a modified control circuit which requires no relays. Timing motor 35 is here connected in the same way as in FIG. 2 in series with trough switch 29 between busses 61, 62. Feed motor 16, however is connected for operation by a two-step stepping switch 125 operated by platform 20, and a set of reciprocal contacts 101, 102 cooperate with a timer switch armature 100. This combination of stepping switch and reciprocal switches along with dispensing motor 16 is connected in parallel with timer motor 35 so that trough switch 29 controls the entire assembly. Timer switch armature 100 is operated by cam 105 having a high lobe 107 and a low lobe 108, the high lobe being arranged to cause armature 100 to engage contact 101 and the low lobe permitting the armature to be pulled away from contact 101 and against contact 102. Weighing switch 125 is arranged so that every time the weighing platform 20 tilts down it moves armature 110 of this switch from one of its contacts 112, 113 to the other, alternately. The operation is the same as in the switch normally used in automobiles to raise and lower the bright headlight beams, and since such switches are well known the internal mechanism is not illustrated in FIG. 3.

In the operation of the control arrangement of FIG. 3 cam 105 has its lobes of equal rotational length corresponding to the time between successive feed dispensing. The assembly is shown in the condition it assumes between dispensings, the trough switch being closed because there is no feed in the trough, timer 35 running, and dispenser motor not running. As the timer continues to cause its cam to rotate, timer armature 100 will eventually drop from the high lobe 107 to the low lobe 108. This causes the armature to engage contact 102, thus closing the energizing circuit for the dispensing motor. Dispensing thereupon begins until the weighing platform tilts and steps switch armature 110 from contact 113 to contact 112. This opens the energizing circuit for the dispensing motor and dispensing stops. The feed from tilted platform 120 drops onto trough 26 opening the trough switch 29. This opens all circuits and stops all power consumption. When the feed is removed the trough switch closes, starting the timer motor again. At the end of the prescribed time delay timer armature 100 will be pushed from low lobe 108 back to high lobe 107, bringing the armature against contact 101 to start the next dispensing cycle.

FIG. 4 shows a control arrangement similar to that of FIG. 3 but using a mechanical device for deenergizing the dispensing motor. The timer cam is here shown at 138 as having a notch 140 into which a following armature 150 drops to close a circuit against contact 152. Cam 138 also carries a pin 154 positioned for engagement by a ratchet arm 156 having advancing notch 158. Ratchet arm is in turn pivoted to a crank arm 160 fixed to the platform as by being clamped to pivot rod 65.

The control of FIG. 4 is shown in dispensing condition, the dispenser motor operating as a result of the timer follower 150 being held in notch 140. When sufficient feed accumulates on platform 20, because of the tilt into the dash-line position crank arm 160 moves ratchet arm 156 to the right, as seen in the figure, until the portion with the advancing notch 158 drops over pin 154. Because the feed then slides off the tilted platform, the platform tilts back, causing ratchet arm 156 to pull the timer cam 138 in the cam-advancing direction indicated by arrow 163. Enough advancement is thereby obtained to cause the follower 150 to be lifted out of timer notch 140, thus opening the dispensing circuit at contact 152.

Timer cam 138 should be arranged so that it can be advanced by the ratchet as by having the cam frictionally engaged by the timer motor through a clutch that permits slippage under the influence of the ratcheting force.

The control arrangement of FIG. 5 uses two timers. The first timer 35 is of the usual type that rotates a cam 201 at the relatively slow speed suitable for long interval feeding. Cam 201 operates a switch 210 at the prescribed intervals and switch 210 only energizes the second timer 235 which operates at a much higher speed. Timer 235 has a cam 238 with a notch 240 that cooperates with a second armature 250 to energize dispensing motor 16 for the desired period of time.

The construction of FIG. 5 is shown with timer switch 210 just closing. Timer 235 will then operate to carry its cam 238 through an entire revolution. During the portion of the revolution in which the notch 240 permits switch 250 to close, dispensing will take place. The two timing cams are also correlated in such a way that by the time one revolution of cam 238 has taken place, cam 201 will move far enough to open its switch 210 again.. To assure such correlation cam 204 can be frictionally driven as described in connection with FIG. 4, with cam 238 connected as by a pin and slot like that of FIG. 4, to advance cam 201 at the end of each rotation of cam 238.

The arrangement of FIG. 5 relies on the timing of fixed timer 235 to measure the amount of feed dispensed. It is preferred, however, to control the dispensing by the weight of the feed dispensed, as in the constructions of FIGS. 2, 3 and 4. For this purpose a locking relay similar to relay 31 in FIG. 2 can be inserted in the circuit of FIG. 5 and operated by switch 250 to lock the dispensing motor into energized condition through a platform switch so that the dispensing terminates when the platform switch is tripped.

FIG. 6 shows a further modified control circuit using a locking relay 331 in a somewhat simpler arrangement that has a double pole platform switch 325. The timing switch 364 can be of a relatively simple type such as that shown in FIG. 2, with locking relay 331 having an armature 371 biased against a front contact 372 and pulled by its winding 370 to a back contact 373. Platform switch 325 has one pole 341 engaging contact 351 when the platform is in its feed-receiving position, the second pole 342 being separated from a contact 352 under those conditions. Tilting of the platform to discharge its weight of feed opens pole 341 and closes pole 342.

In the illustrated condition the control of FIG. 6 has just reached a dispensing time and timer switch 364 closes an energizing circuit for dispenser motor 16 from bus 61 through the motor, pole 341, contact 351, relay contact 372, relay armature 371 and bus 62. As soon as the platform tilts, the dispensing motor circuit is opened at switch pole 341 and switch pole 342 closes an energizing circuit for the winding 370 of the relay 331. Energization of the relay pulls its armature 371 away from contact 372 and against contact 373. The pulling away from contact 372 creates another opening in the energizing circuit for motor 16 and engagement against contact 373 locks the winding into energized condition regardless of the position of switch 342. Accordingly the return of the platform to its feed-receiving position does not deenergize relay 370 so that the dispensing motor is kept deenergized. The trough switch is then opened by the feed dropped into the trough, cutting off all power supply and permitting the relay to return to its deenergized condition. By the time the feed is consumed, the timer will have caused timer switch 364 to open again, thus preparing for the next cycle.

The control arrangement of FIG. 7 has a single timer 435 with two cams 401, 402 having notches 411, 412 that are located with respect to each other in such fashion that cam 402 will operate a switch at some minimum time after cam 401 operates a switch. The difference in time is selected so as to assure that an entire dispensing of feed is completed. Cam 411 operates switch 421 that connects bus 61 to a cam follower armature 431. This armature is biased toward a contact 432 to complete an energizing circuit for dispensing motor 16 when armature 431 is engaged in a notch 451 of a stepping cam 450. The stepping cam has a series of pins 460 arranged for engagement by an advancing claw 465 energized by solenoid 470. Timer cam 402 operates a switch 422 that closes a circuit to solenoid 470. Platform switch 25 is connected in parallel with timer switch 422.

The control arrangement of FIG. 7 is shown just as the timer 435 rotating its cams in the direction indicated by the arrow 438, causes switch 421 to close. The dispensing motor is energized and remains so until the platform switch is closed by the tilting of the platform into discharge position. At that time solenoid 470 is energized, rotating stepping cam 450 half the distance from one notch 451 to the next. This lifts armature 431 away from contact 432, deenergizing the dispensing motor. The trough switch is then opened because it tilts in response to the feed it receives and all power is then shut off until the feed is consumed. At that time the trough switch is returned to its closed condition, starting the timer which runs and carries cam 402 around until it closes switch 422. This energizes the solenoid once more and thus steps the stepping cam 450 around to bring the next notch 451 under follower 431 so that it closes the circuit against contact 432. In the meantime cam 401 has opened its switch 421 so that the dispensing motor will not operate until the next feed cycle.

A plurality of feeders in sufficiently close locations can be interconnected for operation by a single control assembly. To this end one feeder can include a control arrangement as in any of the above constructions, and all the additional feeders for that location can have their own dispensing motors and their own trough switches. Each dispensing motor is connected in series with its trough switch and the series combination connected to the terminals of the first dispensing motor. For such a combination it is desirable that the timing motor be arranged to run continuously so that the entire control assembly is not disabled merely because the feed on one of the troughs remains unconsumed.

Where current-responsive devices are relied on to terminate a dispensing operation, they should be arranged to respond well to low battery voltages, as when the battery is weak. For example, the locking relay 331 of the construction of FIG. 6 or the solenoid 470 of the construction of FIG. 7 can be arranged to provide more than adequate mechanical response so as to assure proper operation when the battery nears the end of its useful life. In addition, these members may be connected to the battery busses 61, 62 through the minimum number of switches, as for example by a by-pass line shunting the trough switch. In the construction of FIG. 6 the holding relay 331 can have its armature 371 used only in a lock-in circuit and connected directly to bus 62, a second armature being supplied for engagement with contact 372 when the relay is not energized. The second armature can then be connected through the trough switch to the bus 62. Again in FIG. 6 the holding relay 331 can have its connection to bus 61 made through switch 364, if desired, to minimize the danger of unintentional locking as by improper operation of the weighing switch.

It is not essential to have the trough switch control all the circuits. In some instances, for example where the feeder is arranged to supply feed to wild animals, the animals in time of hardship may stay near the feeder when it is not dispensing, and hold the trough switch open. In such use it is preferred to at least keep the timer motor running at all times regardless of the position of the trough switch.

On the other hand, some animals may cause the trough switch to open and close frequently or to stay open during the dispensing of the feed. With feeders designed for this purpose the dispensing motor circuit can by-pass the trough switch. In the construction of FIG. 5 both the dispensing motor and the high speed timer 235 can bypass the trough switch to assure a proper dispensing of feed even if the trough switch is opened during the dispensing step.

Instead of having the control arrangements battery-operated, they can be operated by standard 110 volt electrical power supplies. Also the timers can be of the mechanical type which is spring-operated rather than electrically operated, the spring being rewound at the end of each timing cycle as by the operation of the dispensing motor.

Obviously many modifications and variations of the present invention are possible in the light of the above teachings. It is, therefore, to be understood that within the scope of the appended claims the invention may be practiced otherwise than as specifically described.

What is claimed:

1. An animal feeder comprising in combination a structure to support an elevated bulk storage bin with a hopper bottom lower outlet opening therein, a discharging device in said opening and connected to cyclically operated drive means to discharge feed from the opening when the drive means is energized, a counterweighted magnetically latched tilting platform weighing device below the opening to receive the discharged feed and hold it until the feed so accumulated tilts the platform down, a yieldable feed trough positioned to catch the feed from the tilted platform and be moved into feeding position at the end of a discharge cycle, and control elements including a timer mechanism connected to energize the drive means at predetermined feeding times provided the trough is not moved into feeding position, and to stop said drive means when the platform tilts down at the end of a discharge cycle.

2. The combination of claim 1 in which the control elements are battery operated and the trough is connected to stop all consumption of battery power so long as the trough is in feeding position.

3. The combination of claim 1 in which the timer mechanism is battery operated and the trough is connected to deenergize the timer mechanism so long as the trough is in feeding position.

4. In an automatic animal feeding apparatus wherein feed is delivered from a storage hopper at timed intervals by a primary feed means to a first receiving means, and wherein automatic, adjustable, weighing means are provided in said first receiving means to terminate the flow of feed from said hopper, and wherein said first receiving means is counterbalanced to deliver said feed to an animal feed trough in position below the first receiving means, the improvement according to which the feed trough is yieldable from said position under the weight of the feed delivered to it by the first receiving means, and dispensing control means is connected to said feed trough and to said primary feed means to disable the feed means in response to the yielding of the feed trough and to terminate the disabling when the feed trough returns to its receiving position.

5. An automatic animal feeding device comprising a bulk storage bin having a bottom converging downwardly into a vertical open ended delivery orifice tube, a cone shaped helix spring rotatably mounted in said tube for cyclical actuation by timing means, an adjustable portion weighing device located below said orifice tube comprising a tilting counterweighted platform, and a yieldable feed trough located below said platform to yield when said portion weighing device discharges feed thereon at the end of a weighing cycle, first switch means connected to the trough and said timing means to hold the timing means inoperative until removal of said feed from the trough, and second switch means connected to the platform and the timing means to terminate the actuation of the helix spring when the platform is tilted by a weighed amount of feed at the end of a weighing cycle.

6. A dispensing device for controlling the flow of a body of particles, said device having a cylindrical spout, and a conically helical spring within the spout with the widest portion of the spring substantially blocking the spout and causing a body of the particles to wedge into non-flowing condition, the spring being mounted for rotation around its conical axis to thereby cause the particles so wedged to loosen and flow past the spring.

7. A time-controlled animal feeding device for delivering predetermined quantities of feed at relatively widely spaced time intervals, said device including a timer with a correspondingly long-cycled timer switch, an electrically operated positive feed dispenser controlled by said switch and having a relatively short dispensing cycle to dispense feed from a supply thereof, said short cycle being such that the timer switch is incapable of terminating the feed dispensing, and electrical relay structure having contacts connected through a switch responsive to the completion of a dispensing cycle to disable the dispenser until the next timer cycle.

8. A time-controlled animal feeding device for delivering predetermined quantities of feed at relatively widely spaced time intervals, said device including a timer with a correspondingly long-cycled timer switch, an electrically operated positive feed dispenser controlled by said switch and having a relatively short dispensing cycle to dispense feed from a supply thereof, said short cycle being such that the timer switch is incapable of terminating the feed dispensing, and timer advancing mechanism connected to overrun the timer when a dispensing cycle is completed, and thereby advance the timer switch to the next switch cycle.

9. A time-controlled animal feeding device for delivering predetermined quantities of feed at relatively widely spaced time intervals, said device including a timer with a corresponding long-cycled timer switch, an electrically operated positive feed dispenser controlled by said switch and having a relatively short dispensing cycle to dispense feed from a supply thereof, said short cycle being such that the timer switch is incapable of terminating the feed dispensing, and an additional timer with a switch having a cycle short enough to directly control the dispensing, the first timer switch being connected to energize the additional timer.

10. A time-controlled animal feeding device for delivering predetermined quantities of feed at relatively widely spaced time intervals, said device including a timer with a correspondingly long-cycled timer switch, an electrically operated positive feed dispenser controlled by said switch and having a relatively short dispensing cycle to dispense feed from a supply thereof, said short cycle being such that the timer switch is incapable of terminating the feed dispensing, and an additional timer switch connected reciprocally with respect to the first timer switch, and a shift mechanism is connected to the dispenser to alternately shift from one switch to the other when successive dispensing cycles are completed.

11. An automatic animal feeder comprising an elevated bulk storage hopper carrying a timer-controlled cyclic dispensing mechanism, a weighing platform positioned to receive feed dispensed by the dispensing mechanism and to tilt to discharge the feed when it accumulates to a predetermined weight on the platform, a feeding trough positioned to catch the feed discharged from the platform and to trip a switch at the end of a feed-dispensing cycle, said switch being connected to disable the dispensing means and keep uneaten feed from accumulating in the trough.

12. The combination of claim 11 in which the dispensing mechanism is battery operated and the switch is connected to stop all consumption of battery power when tripped.

13. The combination of claim 11 in which the timer is battery operated and the switch is connected to deenergize the timer when tripped.

14. An automatic dispensing mechanism for dispensing predetermined amounts of fluent material, said mechanism having a tilting platform balanced to receive the material while in receiving position, to tilt down when the material accumulates to the desired weight to discharge the accumulation, and to tilt back to the receiving position when the accumulated material is discharged, stop structure positioned to limit the platform movement when it tilts back to said receiving position, and magnet elements connected to the platform and to the stop structure to provide a relatively strong magnetic attraction between the platform and the stop when the platform is in said receiving position, but to provide substantially no attraction when the platform is tilted away from that position, to make the dispensing more positive.

15. In an intermittently operated animal feeder that dispenses a predetermined quantity of particulate feed at widely spaced intervals over an extended period of time, the improvement according to which the feeder has a dispensing device that includes an automatically tripping weighing platform, a cylindrical spout through which feed particles are delivered to the platform, and a conically helical spring within the spout with the widest portion of the spring substantially blocking the spout and causing the feed particles to wedge into non-flowing condition, the spring being mounted for rotation around its conical axis to cause the particles so wedged to loosen and flow past the spring when the spring is rotated.

16. A time-controlled automatic animal feeder comprising an elevated feed holder, a feed trough for holding dispensed feed until removed by the animal to be fed, a time-controlled electrically operated dispensing device connected to the holder to dispense a predetermined quantity of feed onto the feed trough, and switch means connected to be tripped by the feed trough when said feed quantity is dispensed and to be restored when the dispensed feed is removed, said switch means being further connected to disable the time-controlled dispensing so long as the switch means remains tripped.

17. The apparatus of claim 16 further including a long-cycled timer for actuating the dispensing at relatively widely spaced intervals, the dispensing device having a dispensing cycle so short that the long-cycled timer is incapable of properly terminating the dispensing, and blocking elements are connected to the dispensing device to limit the dispenser cycling to a single dispensing cycle per timer cycle.

References Cited by the Examiner
UNITED STATES PATENTS

| | | | |
|---|---|---|---|
| 983,919 | 2/1911 | McGuigan | 119—51.11 |
| 1,471,919 | 10/1923 | Robinson | 119—51.11 X |
| 2,538,413 | 1/1951 | Chard | 119—51.11 X |
| 2,538,421 | 1/1951 | Knarreborg | 119—51 X |
| 2,909,055 | 10/1959 | Fish | 73—1 |
| 3,022,842 | 2/1962 | Mafrica | 177—80 |
| 3,071,202 | 1/1963 | Lytton et al. | 177—80 |
| 3,101,159 | 8/1963 | Fletcher | 222—70 |
| 3,113,556 | 12/1963 | Jarvis | 119—51.11 |

FOREIGN PATENTS 5,686    3/1894    Sweden.

References Cited by the Applicant
UNITED STATES PATENTS

| | | |
|---|---|---|
| 1,881,060 | 10/1932 | Okey. |
| 3,152,655 | 10/1964 | Allen et al. |

SAMUEL KOREN, *Primary Examiner.*

ALDRICH F. MEDBERY, *Examiner.*